United States Patent [19]

Voroney

[11] Patent Number: 5,645,623
[45] Date of Patent: Jul. 8, 1997

[54] PROCESS FOR DISPOSAL OF DECOMPOSABLE ORGANIC WASTE

[75] Inventor: R. Paul Voroney, Guelph, Canada

[73] Assignee: Organic Resource Management Inc., Mississauga, Canada

[21] Appl. No.: 378,738

[22] Filed: Jan. 26, 1995

[51] Int. Cl.$^6$ .................................................... C05F 9/04
[52] U.S. Cl. .............................. 71/9; 71/12; 71/13; 71/23; 71/25
[58] Field of Search ........................... 71/9, 10, 12, 13, 71/20, 22, 23, 24, 25

[56] References Cited

U.S. PATENT DOCUMENTS 5,100,455   3/1992   Pinckard ............................... 71/9

*Primary Examiner*—Ferris Lander
*Attorney, Agent, or Firm*—Mirek A. Waraksa

[57] ABSTRACT

A process for disposal of organic waste containing large quantities of fat or oil. A sample of the waste is decomposed in soil containing ample quantities of nutrients required for decomposition, specifically nitrogen and phosphorus. Resulting test data indicates how much nutrient material is required for decomposition, and how much, and when, nutrient material is released to the soil after decomposition. The waste is then incorporated into soil in a field, and nutrients are applied to induce a rapid decomposition phase in which soil organisms absorb and immobilize the applied nutrients to decompose the waste and a subsequent mineralization phase in which the soil organisms release nutrients to the soil. A crop is appropriately selected and planted to begin absorbing significant quantities of soil available nutrients during the mineralization phase. The amount of applied nutrient material corresponds to crop growth requirements plus waste decomposition requirements less nutrients released during the mineralization phase, effectively reducing nutrient requirements for rapid waste decomposition. Soil organisms and crop growth tend to immobilize soil available nutrients through the process, and no soil available nutrients remain after completion of the process. Leaching of nutrients to groundwater is minimized.

14 Claims, 1 Drawing Sheet

PROCESS FOR DISPOSAL OF DECOMPOSABLE ORGANIC WASTE

FIELD OF THE INVENTION

The invention relates generally to disposal of organic waste, and has particular application to organic waste containing large quantities of fats and oils.

BACKGROUND OF THE INVENTION

Decomposable organic waste is often buried in landfill sites. "Organic waste" for purpose of this specification is essentially animal and vegetable matter. Spoiled produce and meat products from large grocery chins, table scraps from restaurants, the contents of grease traps in food processing plants and restaurants, and fat and animal by-products from packing houses are typical sources of such organic waste. In a landfill site, soil microorganisms are expected to decompose the waste. However, lack of oxygen to subsurface soil and lack of appropriate nutrients to support decomposition result in very poor break-down of the waste. Even simple vegetable matter devoid of fats and oils may be preserved for decades.

Disposal of oil-containing organic waste remains a particularly acute problem. The term "oil-containing" as used in this specification should be understood as materials containing "fat, oil and grease" as those terms are currently used in the waste disposal industry or combinations of such materials. It also encompasses organic materials such as mineral oil. All such oil-containing materials are essentially fats or oils, ultimately of vegetable or animal origin, which are decomposable by soil organisms.

Many cities have begun to halt or severely restrict dumping of oil-containing organic waste in land-fill sites. The products of decomposition pose a potential threat to groundwater, which continues for many years owing to slow decomposition rates. In state-of-the-art landfill sites, where leachate is collected to avoid contamination of groundwater, the products of decomposition are commonly processed at water treatment facilities, which entails additional cost. One approach permitted in landfill sites involves entombment of such wastes. The waste is incorporated into other materials that form solid permanent bodies, avoiding potential groundwater contamination. Entombment processes are costly, and incineration is a principal alternative.

Direct application of oil-containing waste to surface soil has not been permitted in many jurisdictions. Although soil microorganisms can potentially decompose fats and oils, soil conditions are usually inappropriate for effective and rapid decomposition. The waste materials tend to linger, attracting insects and rodents. The lingering fats and oils also tend to alter the physical properties of the soil, interfering with absorption and distribution of water, which can deleteriously affect growth of a crop in a subsequent season.

Oil-containing waste might be applied to surface soil and rapidly decomposed with appropriate nutrients. Such waste typically has a high carbon content, but comparatively little nitrogen and phosphorus to support decomposition of the carbon by soil organisms. Nitrogen and phosphorus might be applied to the soil in sufficient quantities to induce rapid decomposition. The prior art does not appear to have pursued such an approach. Large quantities of nitrogen and phosphorus are required, making the approach costly. The large quantities of nitrogen and phosphorus also create a very serious risk of groundwater contamination.

It would thus be desirable to provide a process for disposal of organic waste, particularly oil-containing waste, which, unlike prior processes, does not pose an environmental threat, is cost-effective, and results in a benefit beyond mere disposal of waste.

BRIEF SUMMARY OF THE INVENTION

In general terms, the invention provides processes for disposing of decomposable organic waste by decomposition in soil in which waste decomposition and growth of a crop are coordinated to effectively reduce nutrient requirements for waste decomposition and to reduce the risk of leaching of nutrients into groundwater. The processes are beneficial, producing soil organic matter that enhances the growing qualities of the soil.

In one aspect, the invention provides a process for disposing of decomposable organic waste, especially oil-containing waste. The process comprises incorporating the waste into disposal soil where soil organisms can decompose the waste. Nutrient material is applied to the soil in an amount that induce a decomposition phase followed by a mineralization phase. In the decomposition phase, soil organisms absorb the applied nutrients to decompose the waste material, including contained fats and oils. In the mineralization phase, the soil organisms release nutrient materials to the soil. A crop is planted that begins absorbing nutrient material during the mineralization phase. The quantity of applied nutrient material will normally include the nutrient requirements for growth of the crop in the particular disposal soil. Since significant crop growth is delayed relative to decomposition, the nutrients otherwise required for crop growth are immediately available to promote waste decomposition. In effect, rapid waste decomposition can be achieved without devoting excessive quantities of nutrients to the waste disposal process. The nutrients consumed during the waste decomposition are in large measure recovered to support a significant growth phase of the crop.

The process will typically involve application of a nutrient material comprising both nitrogen and phosphorus. Nitrogen is preferably applied in an amount corresponding substantially to nitrogen requirements for crop growth plus nitrogen requirements for decomposition of the waste material less nitrogen expected to be released from the mineralization of microbial matter (bio-mass) after decomposition of the waste. Determination of nitrogen requirements for crop growth may include assessment of nitrogen already available in the soil. Phosphorus requirements may be determined in a similar manner. The general object will be to leave minimal amounts of available nitrogen and phosphorus in the soil once the process is complete. Depending on soil conditions, the characteristics of the waste, and the crop, the nutrient material applied may in some instances consist solely of nitrogen or phosphorus.

The waste disposal processes reduce considerably the risk of leaching of nutrients into groundwater relative to conventional agricultural practices. In conventional crop growth, nutrients are applied to the soil when the crop is planted in amounts required for crop growth. The applied nutrients are not immobilized to any significant degree until crop growth is well advanced. In the disposal processes of the invention, applied nutrients are absorbed and immobilized by soil microorganisms during the initial decomposition phase, reducing the risk of leaching. In practice, most of the applied nitrogen will typically be immobilized. During the subsequent mineralization phase, the crop begins to absorb and immobilize nutrients as they are released by the soil microorganisms responsible for waste decomposition, once again reducing the risk of leaching. Furthermore, with nutrients applied in quantities corresponding to crop growth requirements plus decomposition requirements less amounts expected to be released after waste decomposition, no significant quantities of available nutrients should remain in the soil when crop growth is complete.

The nutrient requirement for waste decomposition and the timing of the decomposition and mineralization phases may be assessed by laboratory testing before actual application of waste to disposal soil. A preferred approach is to incorporate a sample of the waste material into test soil to which nitrogen and phosphorus are applied in very ample quantities. The soil may be analyzed at intervals to determine its available nutrient levels. Such analysis will typically indicate when soil available nitrogen reaches a minimum value, indicating completion of the decomposition phase, and then when, and to what level, it increases during the subsequent mineralization phase. The test results indicate how much available nitrogen is required for waste decomposition, how much available nitrogen will be released during the subsequent mineralization phase, and when such available nitrogen is released. Phosphorus levels in the test soil may be similarly sampled and assessed. The test soil may also be analyzed for presence of organic carbon to assess how much beneficial organic matter will be added to soil after waste processing, but such testing and information are not critical to use of the invention.

Various aspects of the invention will be apparent from a description below of preferred embodiments and will be more specifically defined in the appended claims. The terms "disposal soil" and "test soil" as used herein are intended to identify, respectively, soil in which waste will be disposed in bulk and soil used for testing a sample of waste to determine, among other things, nutrient requirements for decomposition of the waste and nutrients released after decomposition.

DESCRIPTION OF THE DRAWINGS

The invention will be better understood with reference drawings in which.

Figure 1:
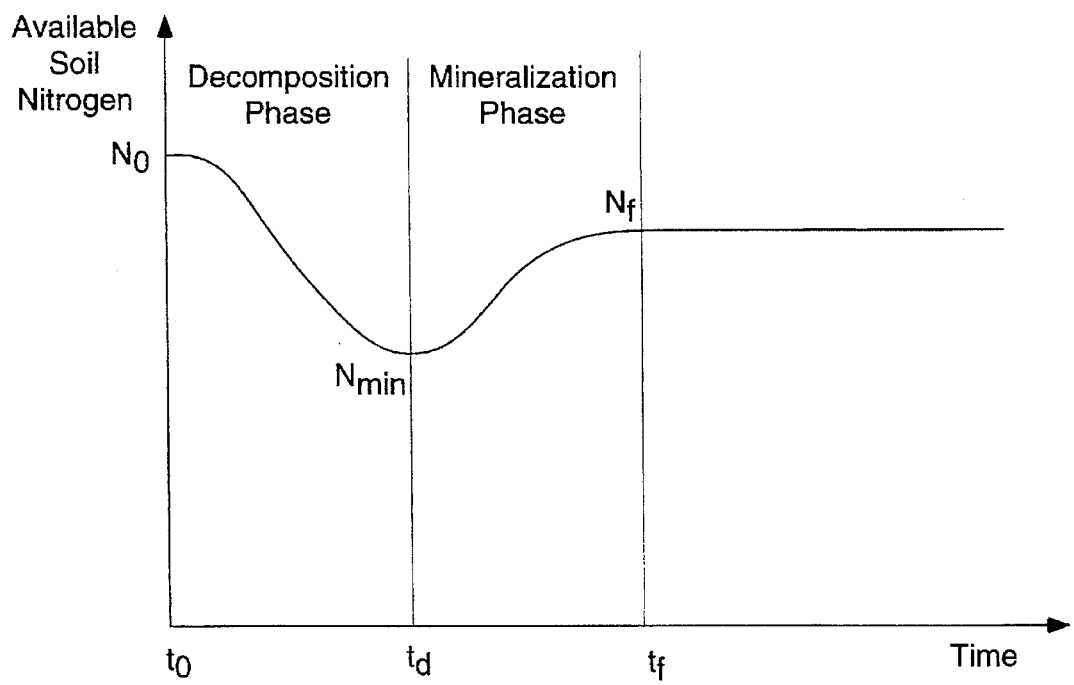
FIG. 1 is a graph qualitatively indicating the results of laboratory testing to assess nitrogen requirements for decomposition of an oil-containing waste; and, FIG. 2 qualitatively indicates various phases in a process for disposing of an oil-containing organic waste, specifically indicating how nitrogen is applied and consumed in the process.

DESCRIPTION OF PREFERRED
EMBODIMENTS

Specific examples of waste disposal processes are provided below. However, an overview of steps that may be used to implement various processes embodying the invention will first be provided.

The processes involve incorporating organic waste into disposal soil such as a field. The soil may be tilled intensively to ensure an aggregate diameter of about 1–2 cm. in the plough layer (about 15 cm. deep) to allow for proper aeration of waste materials and mixing with soil constituents. The organic waste material may be coarsely divided by shredding or grinding and thoroughly mixed to a comparatively uniform size and consistency. The reduction of the waste to a fairly consistent material is important to ensuring proper decomposition. The waste is applied evenly to the soil, and the soil is then tilled to properly incorporate the waste material. A quantity of nutrient material calculated to induce rapid decomposition of the waste material may then be applied to the soil. An appropriately selected crop may thereafter be planted in the soil in a conventional manner. The relative timing of the incorporation of the waste, the application of the supplementary nutrients and the planting of the crop is not singularly critical. No significant crop growth should occur during an initial decomposition phase so that applied nutrients are available for rapid decomposition of the waste, but crop growth should begin absorbing significant quantities of soil nutrients during a mineralization phase that immediately follows the decomposition phase.

A preferred preliminary step involves laboratory testing a representative sample of the waste to determine its basic characteristics. The organic waste may be analyzed to determine the following: total organic carbon, total nitrogen, total phosphorus, inorganic nitrogen (ammonium, nitrites and nitrates), bicarbonate-extractable phosphorus, pH and salt content. Organic carbon and nitrogen content can be determined by standard wet or dry combustion. Phosphorus content can be determined by conventional acid digestion. The pH of the waste can be determined by conventional testing procedures, and salt content can be determined by conventional electrical conductivity tests. pH and salt content are largely secondary issues. pH can be adjusted with acidic or basic additives to achieve a substantially neutral composition. Salt testing is intended to assess whether the waste material poses a potential hazard to crop growth and soil quality. If excessive salts are present, the organic waste should not be disposed using the processes of the invention.

The data derived from such preliminary testing give a general indication of what nutrients are required for waste disposal. Carbon content indicates overall nutrient requirements for waste decomposition. Nitrogen and phosphorus content indicate what nutrients the waste material will itself provide for waste decomposition and crop growth. Pure fats and oils will typically be devoid of nitrogen and phosphorus. Other organic wastes may contain varying quantities of such nutrients.

A representative sample of thoroughly ground and mixed waste material of predetermined weight is then incorporated into test soil in a laboratory in the presence of abundant nutrients. For such purposes, a ratio of total carbon in the waste, applied nitrogen and applied phosphorus of 100:5:1 by weight will normally be adequate. The test soil is kept at an optimal moisture (−60 kPa) and optimal temperature (25 degrees centigrade). Rapid and slow phases of decomposition are permitted, and the process may typically run about 40–55 days to achieve final stable soil conditions. The test soil may be analyzed daily in a conventional manner to assess soil available nitrogen and phosphorus. As well, carbon dioxide resulting from the decomposition of the waste sample may be collected to assess the rate at which the decomposition process proceeds and to assess how much organic carbon is bio-available in the sample. The remaining carbon remains in the soil as beneficial organic material.

A qualitative representation of the soil available nitrogen data that might typically be derived from such laboratory decomposition of a waste sample is shown in FIG. 1. Time is indicated on the horizontal axis, and the quantity of available nitrogen in the test soil is indicated along the vertical axis. The soil available nitrogen content after initial application of nutrients is $N_0$ at time $t_0$ and declines during the decomposition phase. When soil available nitrogen reaches a minimum value $N_{min}$ at a time $t_{min}$, the decomposition phase is substantially complete. During the subsequent mineralization phase, soil available nitrogen content increases. When the mineralization phase is substantially complete at a time $t_f$, the soil available nitrogen content becomes essentially constant at a final value $N_f$. The difference $(N_0-N_{min})$ indicates nitrogen requirements for waste disposal; the difference $(N_f-N_{min})$ indicates how much nitrogen is released during mineralization; and the ratio of the two difference values, namely, $(N_f-N_{min})/(N_0-N_{min})$ indicates what portion of the nitrogen required for decomposition is effectively released during subsequent mineralization. The time $t_{min}$ indicates roughly when decomposition will be complete during actual decomposition of the waste in the field and when mineralization can be expected. The difference $(t_f-t_{min})$ indicates roughly the time period over which immobilized nutrients are apt to be released back to soil during actual waste disposal. Similar data is obtained for soil available phosphorus content. The data gives a general indication of what crops are appropriate and when a selected crop should be planted. Basically, a crop is required whose nutrient requirement phase coincides with the mineralization phase. Selecting an appropriate crop is not particularly critical once the duration of the decomposition phase has been determined. It is only a matter of referring to standard crop manuals and information sources.

Before proceeding with actual waste disposal, nutrient requirements for growth of a particular crop in the particular soil where the waste is to disposed are determined. Basic crop nutrient requirements can be determined by reference to standard crop manuals. The analysis of crop nutrient requirements may include a conventional soil analysis to determine the amounts of nitrogen and phosphorus already available for crop growth. The amount of supplementary nutrient material required to implement the process preferably corresponds to the nutrient requirements for waste decomposition plus the nutrient requirements for crop growth less nutrients released during the mineralization phase. These matters will be more apparent from the particular examples provided below.

EXAMPLE 1: High-Fat Organic Waste

A high-fat organic waste may be subjected to preliminary laboratory testing as described above. A high-fat waste material, such as pure vegetable oil or animal fat, might typically have the following characteristics:

| | |
|---|---|
| Total organic carbon | 85% |
| Total nitrogen | 0% |
| Total phosphorus | 0% |
| Inorganic nitrogen | 0% |
| Bicarbonate-extractable phosphorus | 0% |
| pH | 6.5 |
| salts (mS/cm.) | 2 |

Percentages are by dry-weight.

A sample of the waste material of predetermined weight may then be incorporated into test soil in a laboratory and decomposed in the presence of ample nutrients, as described above. Graphs comparable to those of FIG. 1 may be prepared for both soil available nitrogen and phosphorus. Alternatively, test data may simply be reviewed to identify maxima and minima (e.g. $N_0$, $N_{min}$ and $N_f$ for nitrogen) needed to assess nutrient requirements and nutrients released during mineralization. For this particular example, the data derived from laboratory decomposition may indicate a ratio of 100:2:0.1 between total carbon content, nitrogen required for decomposition and phosphorus required for decomposition. Carbon content is calculated from the weight of the sample and the percentage carbon content indicated by preliminary testing. The data derived from test decomposition may also indicate that 70% of nutrients (both nitrogen and phosphorus) required for decomposition of the waste material are subsequently mineralized and available for crop growth. The laboratory testing may typically indicate that the decomposition and mineralization phases each last 2–3 weeks.

Corn is a suitable crop for use in disposal of the waste. The nutrient requirements for growth of an ample corn crop might be 100 kilograms/hectare (kg/ha) and 20 kg/ha for phosphorus. The waste material might typically be applied to the soil surface (0–15 cm) at 0.5% by weight or about 10,000 kg/ha. The amount of waste material processed can be varied significantly, but there are of course practical limits, such as matching nutrients released during mineralization with crop uptake.

The total amount of nutrient material to be applied to the soil may now be calculated. That amount is substantially the nutrient requirements for crop growth plus nutrient requirements for waste decomposition less nutrients mineralized following decomposition of the waste. Calculations are essentially as follows:

Waste Carbon Content
    carbon=10,000 kg/ha×85%=8500 kg/ha

Nutrients Required for Decomposition
    Nitrogen=8,500 kg/ha×0.02 =170 kg/ha
    Phosphorus=8,500 kg/ha×0.001=8.5 kg/ha Nutrients Released on Mineralization
    Nitrogen=170 kg/ha×70%=119 kg/ha
    Phosphorus=8.5 kg/ha×70%=5.95 kg/ha Nutrients to be Applied
    Nitrogen=100 (crop)+170 (decomposition)−119 (mineralized)=15 1 kg/ha
    Phosphorus=20 (crop)+8.5 (decomposition)−5.95 (mineralized)=22.55 kg/ha The nutrient requirements for the process are slightly higher than those required purely for crop growth. The nitrogen requirement for decomposition of the waste material itself is 170 kg/ha. However, only 51 kg/ha of nitrogen beyond crop requirements are needed to incidentally dispose of the waste material. The phosphorus requirements for decomposition of the waste itself is 8.5 kg/ha, but only 2.55 kg/ha of phosphorus beyond crop requirements are needed for the disposal process.

Within practical limits, the applied nutrients are used entirely for waste decomposition and crop growth. As a consequence, soil nutrient content is not increased after the process. If preliminary soil testing were to indicate, for example, that the soil can supply 20 kg/ha of available nitrogen, then the nitrogen requirements for crop growth would be reduced from 100 kg/ha to 80 kg/ha, and the calculations would indicate that nitrogen should be applied to the soil only at 131 kg/ha. Similar adjustments can be made to accommodate the presence of available phosphorus in the soil.

Figure 2:
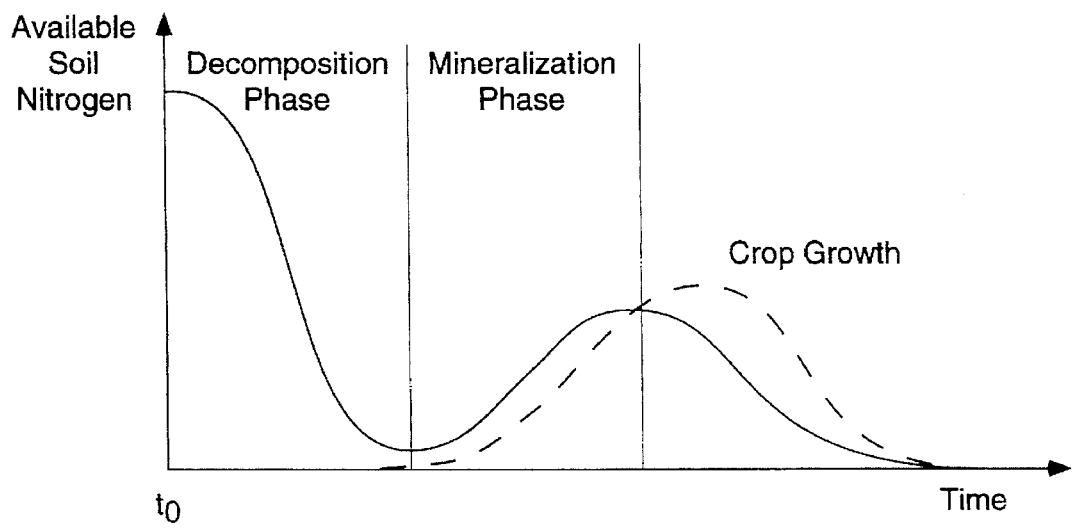

Various aspects of the waste disposal process will be apparent from FIG. 2. Time is once again indicated on the horizontal axis, and soil nitrogen content, along the vertical axis. The solid curve in FIG. 2 indicates soil nitrogen content as a function of time, and the curve in phantom outline indicates the crop grow rate and consequently the incidental rate of uptake of nitrogen by the crop, as a function of time. After the waste material is incorporated into the soil at time $t_0$, the quantity of nutrient material as calculated above is applied to the soil, including 151 kg/ha of nitrogen, and the crop is planted. The application of the nutrient material induces a rapid decomposition phase in which soil microorganisms absorb and immobilize the applied nutrients. As apparent in FIG. 2, available nitrogen drops to a low level when the decomposition phase is complete. The quantity of nitrogen initially applied to the soil is slightly less than requirements determined by laboratory decomposition, and a measure of mineralization does occur during the decomposition phase to sustain decomposition. However, the net effect is decomposition of the waste and immobilization of soil available nitrogen by soil organisms. As mentioned above, the decomposition phase might typically last 2–3 weeks. During the decomposition phase, the crop undergoes no significant growth and for practical purposes requires no nutrients such that virtually all applied nutrients are available for waste decomposition. There follows a mineralization phase in which the microorganisms responsible for decomposition of the waste themselves decompose to release available nutrients. During the mineralization phase, the crop begins a significant growth phase and begins to absorb significant quantities of the soil nutrients (as compared to crop nutrient demand during the decomposition phase). This absorption continues until crop growth is complete and declines for practical purposes to zero. When crop growth is essentially complete, all available nitrogen has been removed from the soil.

Although soil available phosphorus has not been graphically illustrated, it will be appreciated that phosphorus is similarly immobilized and released. Since phosphorus is initially applied in quantities exceeding waste decomposition requirements, soil available phosphorus does not drop as dramatically as does soil available nitrogen when the decomposition phase is complete. When crop growth is complete, however, substantially no available phosphorus remains in the soil. It should be noted that the decomposition phase reduces soil available nutrients during the critical period when crop growth is comparatively slow. Nutrients are released during the mineralization phase, but crop growth begins to absorb nutrients as they are released. The net effect is to reduce the risk of leaching of nutrients into groundwater.

EXAMPLE 2: Low-Fat Organic Waste

The preliminary analysis procedures described above are followed to determine basic characteristics of a low fat-content organic waste. In this example, the waste sample may have the following characteristics:

| | |
|---|---|
| Total organic carbon | 85% |
| Total nitrogen | 5% |
| Total phosphorus | 0.5% |
| Inorganic nitrogen | 200 mg/kg |
| Bicarbonate-extractable phosphorus | 50 mg/kg |
| pH | 6.5% |
| salts (mS/cm.) | 2 |

Nutrient requirements for decomposition and nutrients released after decomposition are determined by soil incubation in a laboratory, substantially as described above. The data derived from decomposition in the test soil may once again indicate a ratio of 100:2:0.1 between total carbon content, required nitrogen and required phosphorus. Analyses of soil nitrogen and phosphorus content may indicate that 80% of the nutrients required for decomposition of the waste are subsequently mineralized, the higher percentage in this example reflecting the presence of such nutrients in the waste sample itself. Decomposition might be complete in 2 weeks, and the mineralization phase might typically last 2–3 weeks.

Corn is once again a suitable crop. The nutrient requirements for an ample corn crop will be assumed once again to be 100 kg/ha nitrogen and 20 kg/ha phosphorus. The waste material may be applied to the plough layer of the soil (0–15 cm.) at 0.5% by weight or 10,000 kg/ha. The following calculations may then be made:

Waste Carbon Content waste carbon content=10,000 kg/ha×85%=8,500 kg/ha

Nutrients Required for Decomposition

Nitrogen=8,500 kg/ha×0.02=170 kg/ha

Phosphorus=8.500 kg/ha÷1000=8.5 kg/ha

Nutrients Released on Mineralization

Nitrogen=170 kg/ha×80%=136 kg/ha

Phosphorus=8.5 kg/ha×80%=6.8 kg/ha

Nutrients to be Applied

Nitrogen=100 (crop)+170 (decomposition)−136 (mineralized)=134 kg/ha

Phosphorus=20 (crop)+8.5 (decomposition)−6.8 (mineralized)=21.7 kg/ha.

The waste of example 2 is processed in disposal soil of a field in substantially the manner described above. Nitrogen is applied at 134 kg/ha and phosphorus at 21.7 kg/ha. There is a rapid decomposition phase in which applied nutrients are immobilized and then a subsequent mineralization phase. Crop growth during and subsequent to the mineralization phase absorbs the nitrogen and phosphorus released during the mineralization phase. Once the process is complete, there is ideally no excess available nitrogen or phosphorus in the soil. Given the incidental availability of nitrogen and phosphorus in the waste, the nitrogen and phosphorus that must be applied (respectively 134 kg/ha and 21.7 kg/ha) are lower than in example 1. During the decomposition phase, there is an incidental mineralization that sustains the decomposition phase despite application of smaller quantities of nitrogen. The process is exceptionally viable economically and environmentally sound.

The following should be apparent from the two examples. The processes of the invention are generally applicable to disposal of organic waste. The most significant aspect of the invention is its application to oil-containing organic wastes, particularly materials with high fat or oil content (more than 10% by dry weight).

It should be appreciated that calculation of nutrient requirements in the examples described above are approximate. It is not critical for purposes of the invention that exact measurements or calculations be made. Variations in applied nitrogen of ±10 kg/ha and variations in applied phosphorus of ±5 kg/ha are quite tolerable.

In the examples above, nutrient requirements for waste disposal were calculated on the basis of carbon content. The results of laboratory decomposition of a representative waste sample were expressed as a ratio among carbon content, required nitrogen and required phosphorus. To arrive at such a ratio, the carbon content of the waste sample must be calculated using the weight of the sample and the percentage carbon content determined by preliminary testing. Thereafter, calculation of nutrient requirements for actual waste disposal requires that the weight of the waste be converted into carbon content. This approach reflects the preference of the inventor for tracking carbon, the factor dictating nutrient requirements.

Tracking carbon content is not strictly necessary. The calculation of nutrient requirements for waste disposal processes may be based solely on the data derived from laboratory decomposition of a representative waste sample of known weight in test soil. Such laboratory decomposition immediately provides ratios between the weight of a waste sample, the nutrients required to decompose the waste sample ($N_0-N_{min}$ for nitrogen), and the nutrients expected to remain in the soil after mineralization ($N_f-N_{min}$ for nitrogen). Subsequent calculation of nutrient requirements for actual waste disposal can be based directly on the weight of the waste to be applied to the disposal soil rather than the carbon content of the waste.

Laboratory decomposition tests need not be repeated if waste such as vegetable oil or animal fat is received from a consistent source. It may be sufficient to analyze a sample of the waste to confirm that basic characteristics have not changed.

It will be appreciated that particular embodiments of the invention have been described and that modifications may be made therein without departing from the spirit of the invention or necessarily departing from the scope of the appended claims.

I claim:

1. A process for disposing of a decomposable oil-containing organic waste material, comprising:

incorporating the waste material into disposal soil;

applying nutrient material to the disposal soil thereby to induce a decomposition phase in which soil organisms absorb the applied nutrient material and decompose the waste material and a mineralization phase following the decomposition phase in which the soil organisms release nutrient materials to the disposal soil; and, growing a crop in the disposal soil that requires the nutrient material for crop growth, the growth of the crop being timed such that the crop only begins to absorb nutrient material from the disposal soil during the mineralization phase.

2. The process of claim 1 in which the applied nutrient material is applied in an amount that leaves substantially no available nutrient material in the soil after crop growth.

3. The process of claim 1 comprising:

testing a sample of the waste material to determine the quantity of nutrient material required for decomposition of the waste material; and, determining the quantity of nutrient material required for growth of the crop;

the quantity of the applied nutrient material exceeding the quantity of nutrient material required for growth of the crop but being less than the quantity of nutrient material required to decompose the waste material plus the quantity of nutrient material required for growth of the crop.

4. The process of claim 1 comprising:

incorporating a sample of the waste material into test soil containing sufficient nutrient material to produce a complete decomposition of the sample by soil organisms and analyzing the test soil at intervals to determine the quantity of nutrient material required to decompose the sample and the quantity of nutrient material released to the test soil after decomposition of the sample; and, determining the quantity of nutrient material required to grow the crop;

the quantity of the nutrient material applied to the disposal soil being the determined quantity of nutrient material required to grow the crop plus a quantity of nutrient material determined according to the analysis is to be required to decompose the waste material less a quantity of nutrient material determined according to the analysis to be released after decomposition of the waste material.

5. The process of claim 1 in which the application of the nutrient material comprises applying nitrogen to the soil in an amount corresponding substantially to nitrogen requirements for growth of the crop plus nitrogen requirements for decomposition of the waste material less nitrogen in the released nutrient material.

6. The process of claim 5 in which the application of the nutrient material comprises applying phosphorus to the soil in an amount corresponding substantially to phosphorus requirements for growth of the crop plus phosphorus requirements for decomposition of the waste material less phosphorus in the released nutrient material.

7. The process of claim 1 in which the waste material has a combined fat and oil content greater than 10% by dry weight.

8. The process of claim 1 comprising dividing and mixing the waste material thereby to increase the consistency of the material before the incorporating the waste material into the disposal soil.

9. A process for disposing of decomposable organic waste material, comprising:

testing a sample of the waste material to determine the quantities of nitrogen and phosphorus required for decomposition of the waste material by soil organisms and to determine the quantities of nitrogen and phosphorus released after decomposition of the waste material, and determining the quantities of nitrogen and phosphorus required to grow a preselected crop;

incorporating the waste material into disposal soil;

applying nitrogen and phosphorus to the soil thereby to induce a decomposition phase in which soil organisms decompose the incorporated waste material and a mineralization phase following the decomposition phase in which the soil organisms release nitrogen and phosphorus to the soil, the applied nitrogen being applied in an mount corresponding substantially to the quantity of nitrogen determined according to the testing to be required for decomposition of the waste material plus the quantity of nitrogen determined to be required for growth of the crop less the quantity of nitrogen determined according to the testing to be available after decomposition of the waste material, the applied phosphorus being applied in an mount corresponding substantially to the quantity of phosphorus determined according to the testing to be required for decomposition of the waste material plus the quantity of phosphorus determined to be required for growth of the crop less the quantity of phosphorus determined according to the testing to be available after decomposition of the waste material; and, planting the preselected crop in the soil such that the crop absorbs nitrogen and phosphorus released to the soil during the mineralization phase.

10. The process of claim 9 in which the testing of the sample comprises:

incorporating the sample into test soil containing nitrogen and phosphorus sufficient to produce a complete decomposition of the sample by soil organisms; and, analyzing the test soil at intervals to determine the quantities of nitrogen and phosphorus required to decompose the sample and the quantities of nitrogen and phosphorus released to the test soil after decomposition of the sample.

11. The process of claim 10 in which the waste material has a combined fat and oil content greater than 10% by dry weight.

12. A process for disposing of decomposable organic waste material, comprising:

incorporating a sample of the waste material into test soil and applying sufficient nutrient material to the test soil to produce a complete decomposition of the sample by soil organisms;

analyzing the test soil at intervals to determine the quantity of nutrient material required to decompose the sample and the quantity of nutrient material released after decomposition;

determining the quantity of nutrient material required to grow a predetermined crop in the disposal soil;

incorporate the waste material into disposal soil;

applying nutrient material o the disposal soil thereby to induce a decomposition phase in which soil organisms decompose the incorporated waste material and a mineralization phase following the decomposition phase in which the soil organisms release nutrient material to the disposal soil, the applied nutrient material being applied in an amount exceeding the quantity of nutrient material determined to be required for growth of the crop and less than the sum of the quantity of nutrient material determined to be required to decompose the waste material and the quantity of nutrient material determined to be required for growth of the crop; and, planting the crop in the disposal soil such that the crop absorbs nutrient material released to the disposal soil during the mineralization phase.

13. The process of claim 12 in which the quantity of nutrient material applied to the disposal soil is calculated to leave substantially no nutrient material in the disposal soil after crop growth.

14. The process of claim 12 in which the applied nutrient material is applied in an mount corresponding substantially to the quantity of nutrient material determined according to the testing to be required for decomposition of the waste material plus the quantity of nitrogen determined to be required for growth of the crop less the quantity of nutrient determined according to the testing to be available after decomposition of the waste material.

* * * * *